United States Patent
Cornelius et al.

[11] Patent Number: 6,116,020
[45] Date of Patent: Sep. 12, 2000

[54] INJECTOR FOR LIQUID FUELED ROCKET ENGINE

[75] Inventors: Charles S. Cornelius; W. Neill Myers, both of Huntsville; Michael David Shadoan, Madison; David L. Sparks, Huntsville, all of Ala.

[73] Assignee: The United States of America as represented by the Administrator of the National Aeronautics and Space Administration, Washington, D.C.

[21] Appl. No.: 09/168,341

[22] Filed: Oct. 5, 1998

[51] Int. Cl.[7] ........................................... F02K 9/42
[52] U.S. Cl. .................................................. 60/258
[58] Field of Search ........................... 60/258, 257, 740; 239/418, 558, 423

[56] References Cited

U.S. PATENT DOCUMENTS

| | | | |
|---|---|---|---|
| 3,479,819 | 11/1969 | Bogue | 60/258 |
| 3,748,852 | 7/1973 | Cole et al. | 60/258 X |
| 4,644,745 | 2/1987 | Wagner | 60/258 |
| 4,936,091 | 6/1990 | Schoenman | 60/258 X |
| 5,603,213 | 2/1997 | Sion et al. | 60/258 |
| 5,771,579 | 6/1998 | Farhangi et al. | 60/258 X |
| 5,983,626 | 11/1999 | Stahn et al. | 60/258 |

*Primary Examiner*—Charles G. Freay
*Assistant Examiner*—David J. Torrente
*Attorney, Agent, or Firm*—Robert L. Broad, Jr.

[57] ABSTRACT

An injector for liquid fueled rocket engines wherein a generally flat core having a frustoconical dome attached to one side of the core to serve as a manifold for a first liquid, with the core having a generally circular configuration having an axis. The other side of the core has a plurality of concentric annular first slots and a plurality of annular concentric second slots alternating with the first slots, the second slots having a greater depth than said first slots. A bore extends through the core for inletting a second liquid into said core, the bore intersecting the second slots to feed the second liquid into the second slots. The core also has a plurality of first passageways leading from the manifold to the first annular slots for feeding the first liquid into said first slots. A faceplate brazed to said other side of the core is provided with apertures extending from the first and second slots through said face plate, these apertures being positioned to direct fuel and liquid oxygen into contact with each other in the combustion chamber. The first liquid may be liquid oxygen and the second liquid may be kerosene or liquid hydrogen.

8 Claims, 3 Drawing Sheets

INJECTOR FOR LIQUID FUELED ROCKET ENGINE

ORIGIN OF THE INVENTION

This invention was made by employees of the United States Government and may be manufactured and used by or for the Government for governmental purposes without the payment of any royalties.

BACKGROUND OF THE INVENTION

1. Field of the Invention

This invention relates to injectors for rocket engines.

2. Prior Art

All liquid fueled rocket engines use some type of injector for injecting the liquid fuel and liquid oxygen into the engine's combustion chamber. Usually these injectors are very complex and require many parts. These injectors usually require a number of weld joints, some of which cannot be inspected. The complexity of these injectors and the time required to manufacture the many parts making up the injector causes the injector to be very expensive.

SUMMARY OF THE INVENTION

An injector for liquid fueled rocket engines wherein a generally flat core having a frustoconical dome attached to one side of the core to serve as a manifold for a first liquid, with the core having a generally circular configuration. The other side of the core has a plurality of concentric annular first slots and a plurality of concentric annular second slots alternating with the first slots, the second slots having a greater depth than said first slots. A bore extends through the core along a diameter of the core for inletting a second liquid into said core, the bore intersecting the second slots to feed the second liquid into the second slots. The core also has a plurality of first passageways leading from the manifold to the first annular slots for feeding the first liquid into said first slots. A faceplate brazed to said other side of the core is provided with apertures extending from the first and second slots through said face plate, these apertures being positioned to direct the first and second liquids into contact with each other in the combustion chamber. The first liquid may be liquid oxygen and the second liquid may be kerosene or liquid hydrogen.

DETAILED DESCRIPTION OF THE INVENTION

Figure 1:
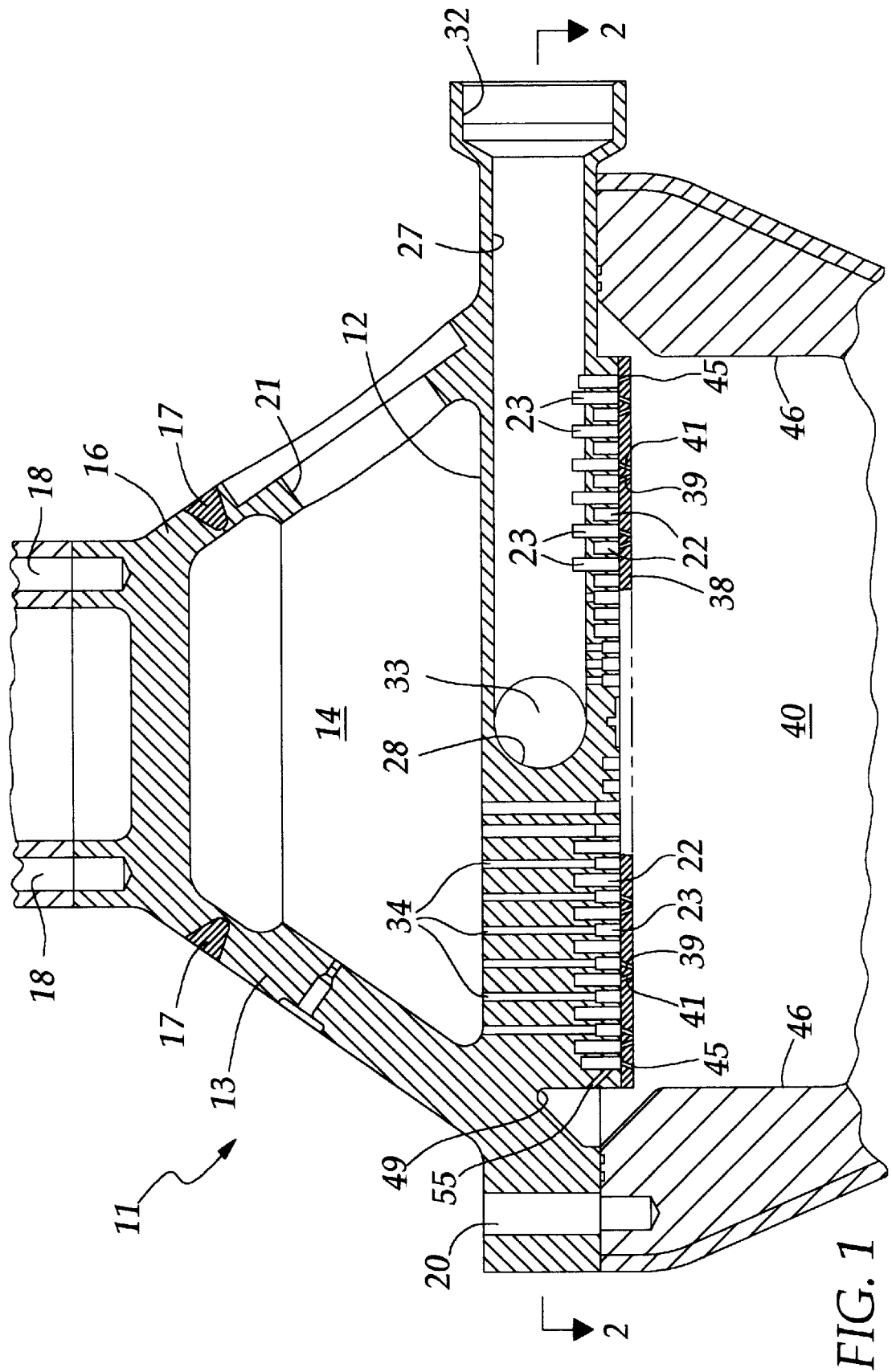
FIG. 1 is a cross sectional view of the injector taken on line 1—1 of FIG. 2 showing the passageways through the injector core.

Referring now in detail to the drawings, there is shown an injector 11 having a generally flat core 12 having on the upper side a frustoconical dome 13 which serves as a manifold 14 for liquid oxygen. After the dome is machined, a closeout piece 16 is welded to the top of the dome 13 by a weld 17. The upper side of the closeout piece 16 is provided with bolt holes 18 for attaching the injector to a gimbal block (not shown). One side of the dome 13 is provided with an opening 21 for admitting liquid oxygen into the dome.

The lower side of the core is provided with a plurality of concentric, annular first slots 22 and a plurality of concentric, annular second slots 23 alternating with the slots 22. The second slots 23 have a greater depth than the slots 22. As will be described below, liquid oxygen is fed into the first slots 22 while liquid fuel is fed into the slots 23.

Figure 2:
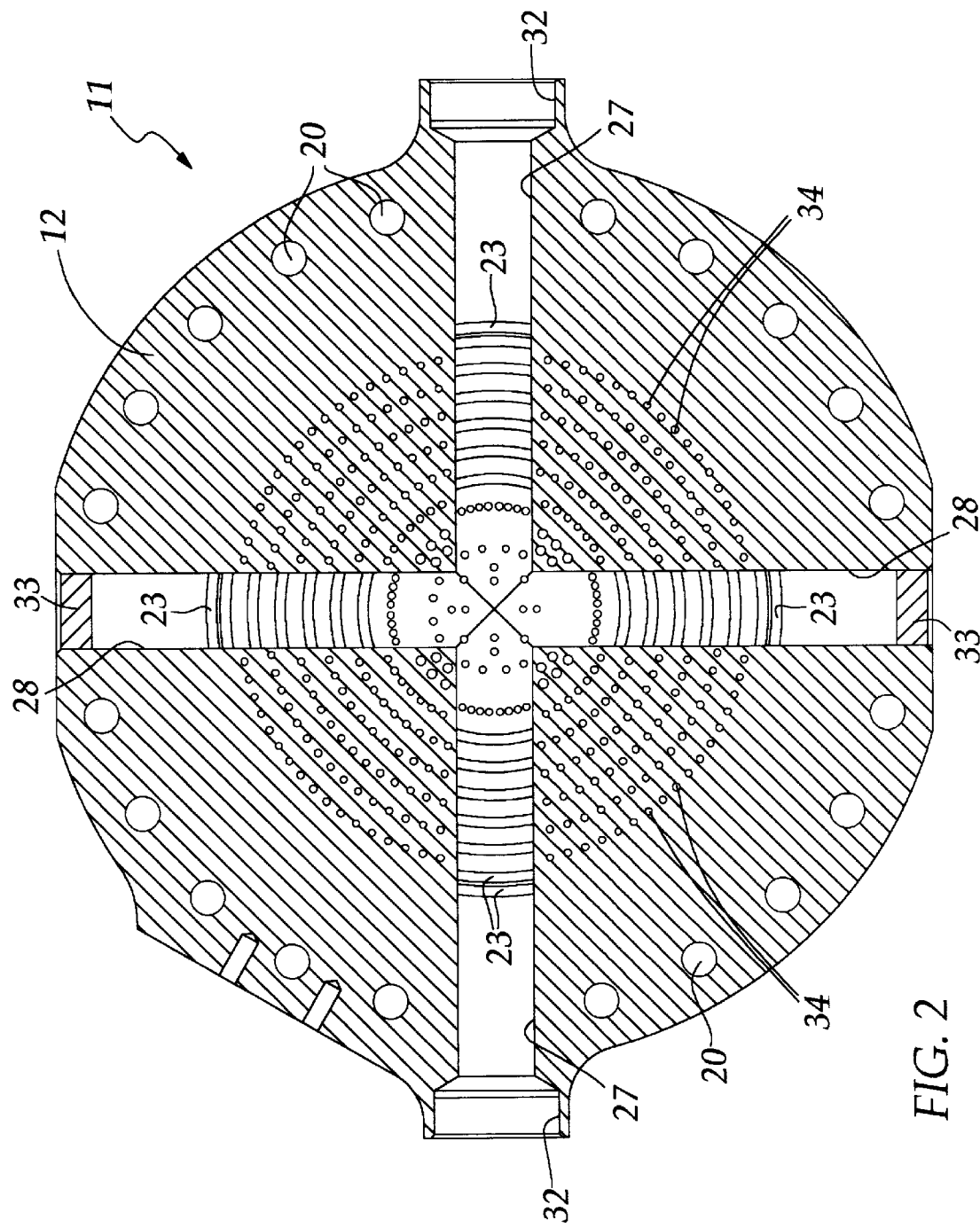
FIG. 2 is a cross sectional view of the injector taken on line 2—2 of FIG. 1 showing the manner in which the fuel inlet bores intersect annular slots in the injector core.

The core 11 is provided with a pair of bores 27 and 28 extending along diameters of the core 11, the bores intersecting each other at 90°. Fuel is fed into the bore 27 from fuel inlets 32 at opposite ends of the bore 27 while opposite ends of the bore 28 are closed by the use of plugs 33 (FIG. 2). The bores intersect the deeper second slots 23 such that fuel flowing into the bores will flow from there into the second slots 23. The core 11 is also provided with a plurality of passageways 34 extending from the manifold 14 through the core to the first slots 22. Thus, liquid oxygen admitted to the manifold will flow into the first slots 22.

Figure 3:
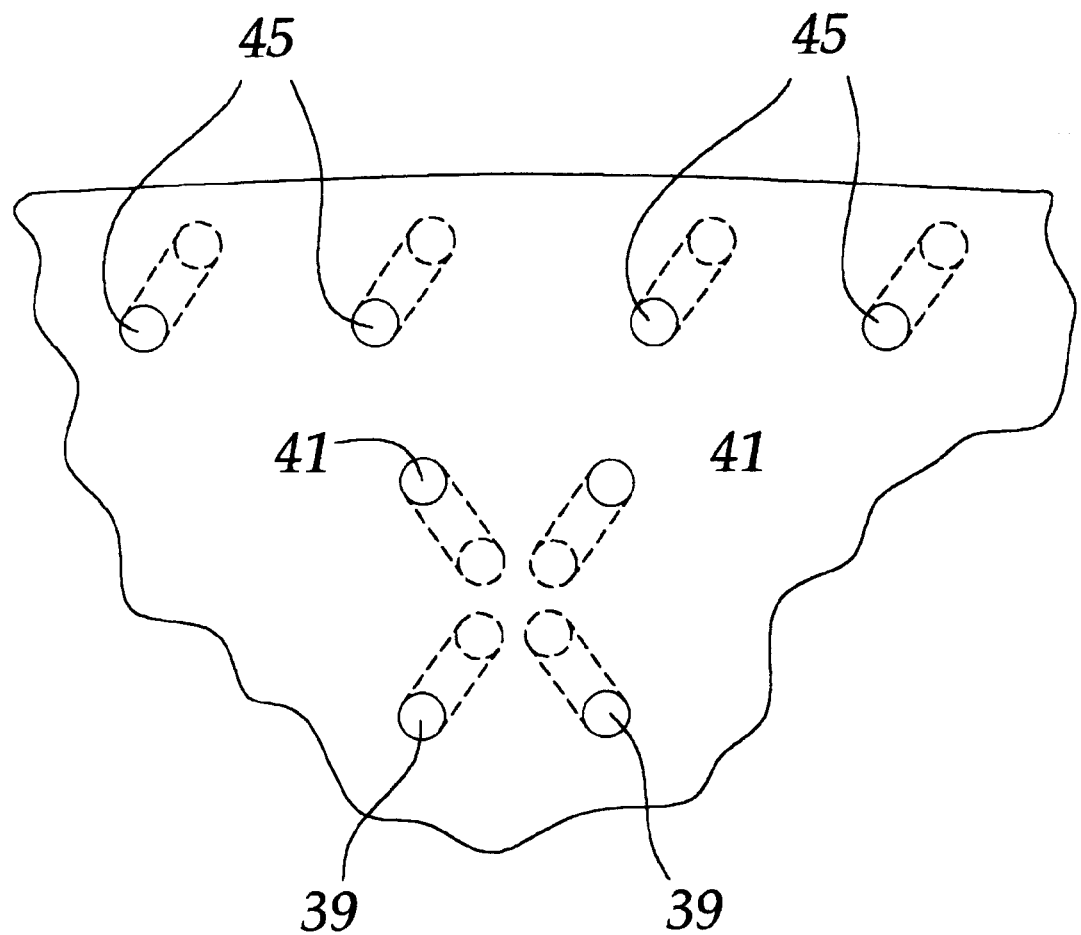
FIG. 3 is an enlarged fragmentary view taken from the brazed side of the faceplate showing how the apertures in the faceplate direct liquid oxygen and kerosene or hydrogen into the combustion chamber below the faceplate.

Brazed to the lower side of the core is a faceplate 38 (FIGS. 1 and 3) having a plurality of pairs of first apertures 39 (FIG. 3) for feeding liquid oxygen from the first slots 22 to the combustion chamber 40 below the faceplate, the combustion chamber 40 having an inner surface, and a plurality of pairs of second apertures 41 for feeding fuel from the second slots 23 to the combustion chamber. FIG. 3 best shows the positioning of the apertures 39 and 41. From this figure it can be seen that the liquid oxygen apertures 39 and fuel apertures 41 direct the liquids toward each other in the combustion chamber. This assures a thorough mixing of the liquids for better combustion.

FIG. 3 also shows a plurality of fuel apertures 45 which direct the liquid fuel onto the surface 46 of the combustion chamber 40 for cooling this surface. These apertures are skewed as shown in FIG. 3 to direct streams of fuel along spiral paths along the surface 46.

FIG. 1 also shows an acoustic cavity or pocket 49 in the lower surface of the core. The purpose of this cavity is to damp out combustion oscillations to enhance stability. Apertures 55 (FIG. 1) direct streams of fuel into the acoustic cavity for cooling purposes.

Bolts (not shown) extend through holes in the periphery of the core 12 to secure the injector to the combustion chamber 40.

In operation, liquid oxygen is fed into the injector 11 through the opening 21 in the dome 13 and passes through the passageways 34 to the first slots 22. From the first slots 22, the oxygen passes through apertures 39 (FIG. 3) in the faceplate 38 into the combustion chamber 40. Fuel (kerosene or liquid hydrogen) enters the injector through the inlets 32 and passes into the second slots 23, which interest the bores 27 and 28. The fuel then flows through the second slots 23 and then through apertures 41 in the faceplate 38 into the combustion chamber 40. The oxygen from the apertures 39 forms a fanlike configuration, as does the fuel from the apertures 39. Both fan-like configurations attempt to occupy the same space, with the result that the streams are thoroughly mixed.

What is claimed is:

1. An injector for liquid fueled rocket engines, comprising:

a. a generally flat core having a frustoconical dome attached to one side of the core to serve as a manifold for a first liquid, said core having a generally circular configuration, the other side of the core having a plurality of concentric annular first slots, said other side of the core also having a plurality of concentric annular second slots alternating with the first slots, said second slots having a greater depth than said first slots, said core also having a bore extending along a diameter of the core for inletting a second liquid into said core, said bore intersecting the second slots to feed the second liquid into said second slots, said core also having a plurality of first passageways leading from said one side of the core to the first annular slots for feeding the first liquid from the manifold into said first slots, and b. a faceplate brazed to said other side of the core and having a plurality of first and second apertures extending from the first and second slots through said faceplate.

2. The injector of claim 1 wherein the core is provided with a second bore extending along a second diameter of the core, said diameters intersecting each other and being generally perpendicular to each other.

3. The injector of claim 1 wherein pairs of the first apertures through the face plate are positioned to direct streams of said second liquid into contact with streams of liquids from said first apertures.

4. The injector of claim 1 wherein said other side of the core is provided with an acoustic cavity for damping combustion oscillations.

5. The injector of claim 4 wherein the core is provided with apertures for directing a portion of the second liquid into said acoustic cavity.

6. The injector of claim 1 wherein the core is attached to a combustion chamber having an inner surface, said core having a plurality of apertures positioned to direct a portion of the second liquid onto said surface for cooling said surface.

7. The injector of claim 6 wherein the apertures are skewed to direct said portion of said second liquid along spiral paths along said surface.

8. An injector for liquid fueled rocket engines, comprising a. a generally flat core having a frustoconical dome attached to one side of the core to serve as a manifold for a first liquid, said core having a generally circular configuration, the other side of the core having a plurality of concentric annular first slots and a plurality of concentric annular second slots alternating with said first slots, said second slots having a greater depth than said first slots, said core having a pair of bores extending through the core on diameters of said core for feeding a second liquid into said core, said bores intersecting said second slots for feeding a second liquid into said slots from the bores, said core having a plurality of passageways extending through the core from the manifold to said first slots to feed a first liquid into said first slots, said other side of said core having an acoustic cavity extending around the periphery thereof for damping combustion oscillations, b. a faceplate brazed to said other side of the core, said faceplate having a plurality of pairs of first apertures for directing the first liquid into converging first streams and a plurality of pairs for second apertures for directing the second liquid into converging second streams, said first and second pairs of apertures being positioned such that said converging first streams converge with said second converging streams, and c. a combustion chamber secured to the core and having an inner surface, said faceplate also having a plurality of apertures for directing a portion of the second liquid into contact with said inner surface, said apertures being skewed such that said portion flows in a spiral path along said surface.

* * * * *